United States Patent [19]
Sekimoto

[11] Patent Number: 5,695,141
[45] Date of Patent: Dec. 9, 1997

[54] FISHING REEL WITH CLUTCH PLATE MOVEMENT LIMITER

[75] Inventor: Akio Sekimoto, Saitama, Japan

[73] Assignee: Daiwa Seiko, Inc., Tokyo, Japan

[21] Appl. No.: 688,794

[22] Filed: Jul. 31, 1996

[30] Foreign Application Priority Data

Aug. 8, 1995 [JP] Japan .............................. HEI.7-222700

[51] Int. Cl.⁶ .............................................. A01K 89/015
[52] U.S. Cl. ................................... 242/260; 242/261
[58] Field of Search ............................. 242/259, 260, 242/261

[56] References Cited

U.S. PATENT DOCUMENTS

| | | | |
|---|---|---|---|
| 2,329,982 | 9/1943 | Coxe | 242/260 |
| 5,246,187 | 9/1993 | Noda | 242/261 |
| 5,467,933 | 11/1995 | Miyazaki | 242/261 |

FOREIGN PATENT DOCUMENTS

| | | |
|---|---|---|
| 1-58932 | 12/1989 | Japan . |
| 2-46295 | 12/1990 | Japan . |

*Primary Examiner*—Katherine Matecki
*Attorney, Agent, or Firm*—Sughrue, Mion, Zinn, Macpeak & Seas, PLLC

[57] ABSTRACT

A clutch mechanism of a reel for fishing which can provide a stable winding operation and a comfortable clutch switching operation under a large load. The clutch mechanism is provided between side plates 1a and 1b of a reel main body, and switches a spool between winding and free conditions such that a pinion gear meshing with a drive gear is engaged with and disengaged from a clutch engagement portion rotatable together with the spool with the aid of a clutch plate operable by a switching member. A limiting portion is provided on the switching member to prevent the clutch plate from moving in a direction opposite to the spool at the winding operation.

10 Claims, 5 Drawing Sheets

FISHING REEL WITH CLUTCH PLATE MOVEMENT LIMITER

BACKGROUND OF THE INVENTION

The invention relates to a reel for fishing, in particular to a clutch mechanism for switching a spool between winding and free conditions.

A reel for fishing is well known and disclosed in, for example, Japanese Examined Patent Publication, No. 1-58932 and Japanese Examined Utility Model Publication No. 2-46295. Such reels comprise a clutch mechanism provided between side plates of a reel main body for switching a spool between a fishline winding condition and a spool free condition.

The clutch mechanism is arranged so as to establish the spool free condition by axially moving a pinion meshing with a drive gear through operation of a switching member provided outside of the reel main body. The switching member operates through a clutch plate biased to the spool side by a spring and exerts a force against the biasing of the spring to disengage the pinion from a clutch engagement portion provided on a spool shaft. The winding condition is restored by operating the switching member again or by rotating a handle in the winding direction to engage the pinion with the engagement portion of the spool shaft by means of the biasing force of the spring.

The pinion should maintain engagement with the engagement portion of the spool shaft even if a load is applied on the spool, for example, when the fishline is drawn in. In this case, the drive gear and the pinion engage with each other through a twisting angle arrangement, such as a helical gear, to bias the pinion in a direction in which the pinion can engage the engagement portion of the spool shaft during the winding operation.

However, the prior art clutch mechanism of the reel for fishing encounters problems. Specifically, in the winding operation during actual fishing, and in particular when winding under a large load, the pinion becomes disengaged from the engagement portion of the spool shaft. This occurs because the pinion axially moves away from the clutch engagement portion of the spool due to, e.g., the load on the pinion and the engagement portion of the spool shaft, the configuration of the clutch engagement portion, the twisting angle of the pinion and the drive gear, and the biasing force of the spring member for biasing the pinion against the engagement portion of the spool shaft. Further, the pinion is not stable since it axially moves, thereby deteriorating the meshing condition with the drive gear caused by the resulting wearing at this location. Thus, there is a problem in that the life of the reel is detrimentally affected. Furthermore, if the twisting angle between the drive gear and the pinion is set too large, then the smooth switching operation from the winding condition to the free condition cannot be carried out.

SUMMARY OF THE INVENTION

The invention is directed to solving the prior art problems described above. Accordingly, an objective of the invention is to provide a clutch mechanism of a reel for fishing which can provide a stable winding operation and a comfortable clutch switching operation to the winding condition even under a large load.

According to the invention, there is provided a reel for fishing including a clutch mechanism for switching a spool, which is provided between side plates of a reel main body, between winding and free conditions, a pinion gear, meshing with a drive gear, engaging the clutch mechanism, and a clutch plate which is engaged with and disengaged from a clutch engagement portion that rotates together with the spool, by axially moving the pinion gear, characterized in that the clutch plate is prevented from moving in a direction opposite to the spool during the winding operation.

DETAILED DESCRIPTION OF THE PREFERRED EMBODIMENTS

With reference to the attached drawings, an embodiment of the invention will be described hereinafter.

Figure 1:
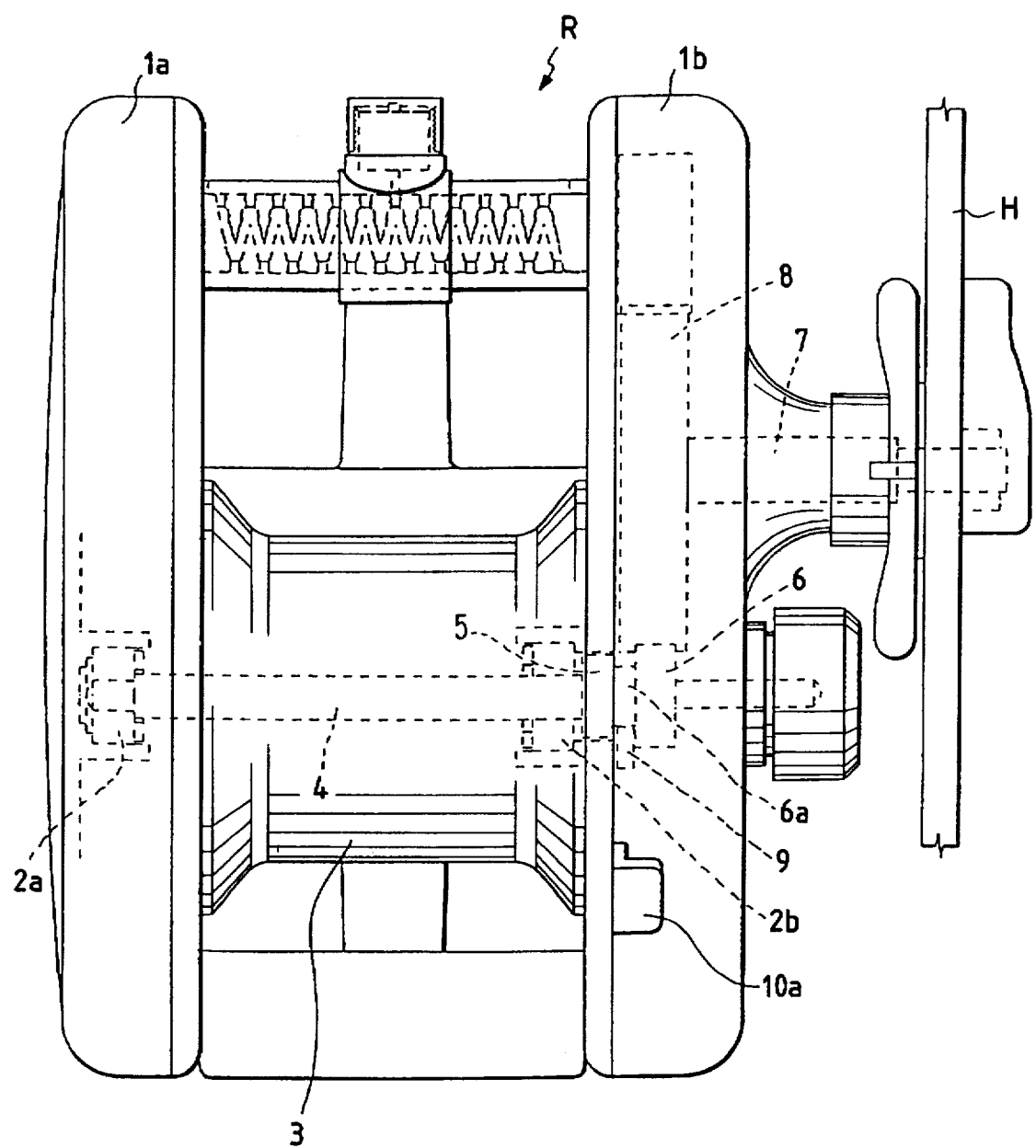
FIG. 1 is a plan view of a reel for fishing, according to the first embodiment of the invention.
Figure 2:
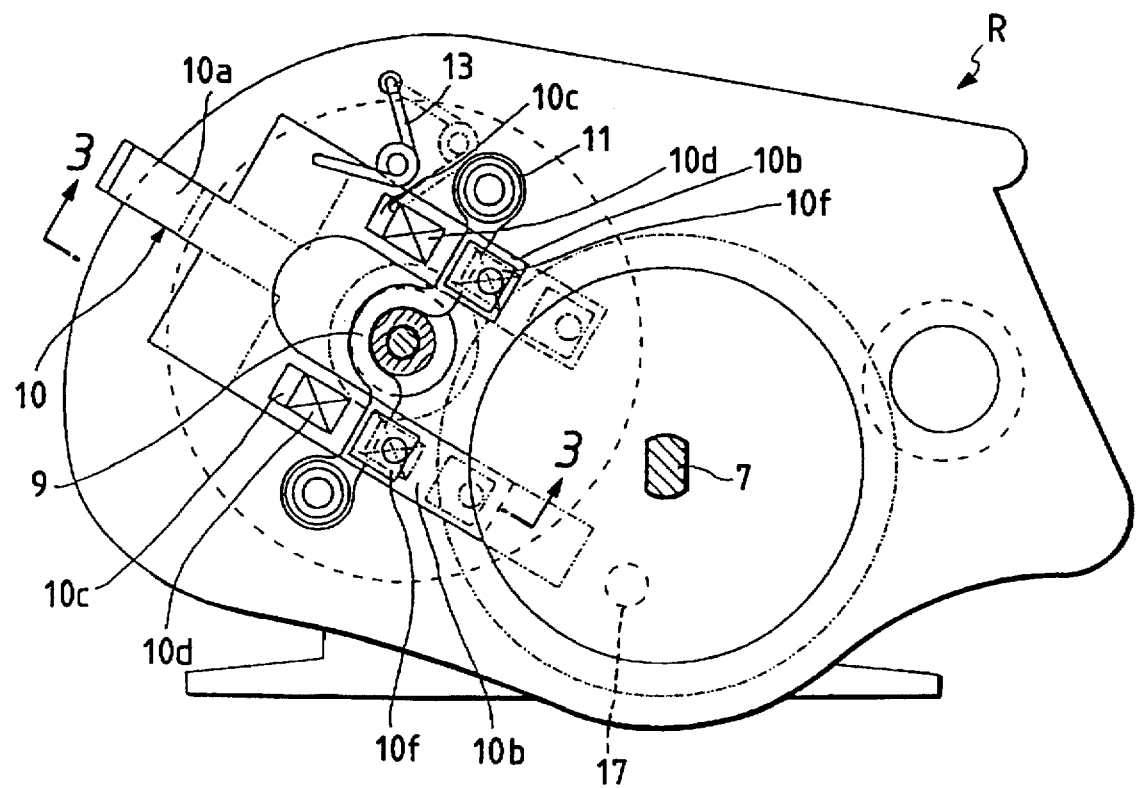
FIG. 2 is a side perspective view of the reel for fishing according to the first embodiment of the invention.

Supported for rotation between right and left side plates 1a and 1b is a spool shaft 4 on which a spool 3 is mounted through bearings 2a and 2b, as shown in FIGS. 1 and 2. On one end of the spool shaft 4, an axially slidable pinion gear 6 is mounted, which meshes a driving gear 8 attached to a handle shaft 7. The pinion gear 6 can engage with and disengage an engagement portion 5 of the spool shaft 4. When the pinion gear 6 engages the spool shaft 4, the rotation of the handle H is transmitted to the spool shaft 4 through the drive gear 8 and pinion gear 6 which results in the rotation of the spool 3 in the winding direction. On the other hand, when the pinion gear 6 disengages from the spool shaft 4, the spool 3 rotates freely.

The clutch mechanism is basically the same as a slide lever type which is well known in the art. It has a clutch plate 9 which engages an annular recess 6a provided along the circumferential surface of the pinion gear 6. It also has a switching member 10 for lifting and lowering the clutch plate 9, a spring member 11 for biasing the clutch plate 9 in the direction of the plate width (spool shaft direction), and a switching biasing spring 13 for switching and biasing the switching member 10 to either a clutch ON or clutch OFF position.

Switching member 10 is a plate member which has an operating portion 10a and opposite branch portions 10b. On the branch portions 10b substantially at the center in the longitudinal direction, protruding cam portions 10c are provided. These cam portions 10c face the clutch plate 9 and are used for positioning the clutch plate 9 into the OFF condition. Guiding slope portions 10d are provided, at the cam portions 10c, for guiding the clutch plate 9 to the top portions of the cam portions 10c. It shall be noted, however, that the basic constitution of the clutch mechanism is not limited to that shown in the drawings.

Figure 3:
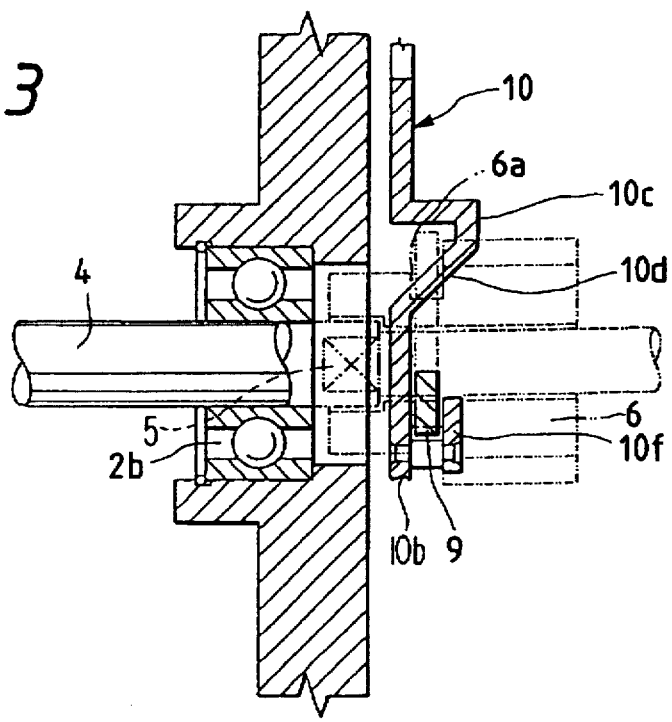
FIG. 3 is a section along line 3—3 in FIG. 2 illustrating a clutch ON condition of the reel for fishing according to the first embodiment of the invention.

Provided on the branch portions 10b of the switching member 10 are limiting portions 10f which limit the movement of the clutch plate 9 in the separating direction away from the spool shaft 4, that is, to the right in FIG. 3, when the clutch is ON. The limiting portions 10f are provided apart from and in parallel to the branch portions 10b and integrally connected to the branch portions 10b. In the invention, the limiting portions 10f can prevent the clutch plate 9 from moving in the disengage direction to hold the clutch ON condition appropriately even if a large load is applied. The limiting portions 10f may be formed according to other configurations, if desired.

One of the branch portions 10b (lower branch portion 10b in FIG. 2) is longer than the other to allow a kick pin 17, which rotates together with the handle shaft 7, to contact the branch portion under the clutch OFF condition. In particular, the winding operation of the handle H results in the kick pin 17 contacting the lower branch portion 10b to move the switching member 10 forcibly to the ON position again when the switching member 10 is at the OFF position.

The functional operation of the clutch mechanism will be described. When the clutch is under ON condition, that is, under a condition which permits winding, the switching member 10 is positioned as shown in FIG. 3, and in particular, as shown by a solid line in FIG. 2. Under this condition, the clutch plate 9 is sandwiched by the plate face of the branched portions 10b and the limiting portion 10f with a slight clearance remaining therebetween to prevent the clutch plate 9 from moving in the separating direction away from the spool shaft 4.

Figure 4:
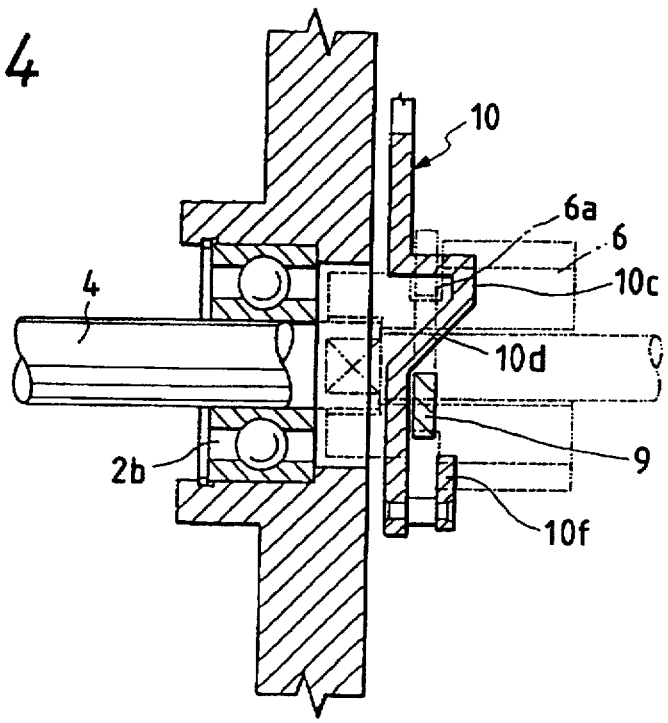
FIG. 4 is a sectional illustration along line 3—3 in FIG. 2 for explanation of the operation of the reel for fishing according to the first embodiment of the invention.
Figure 5:
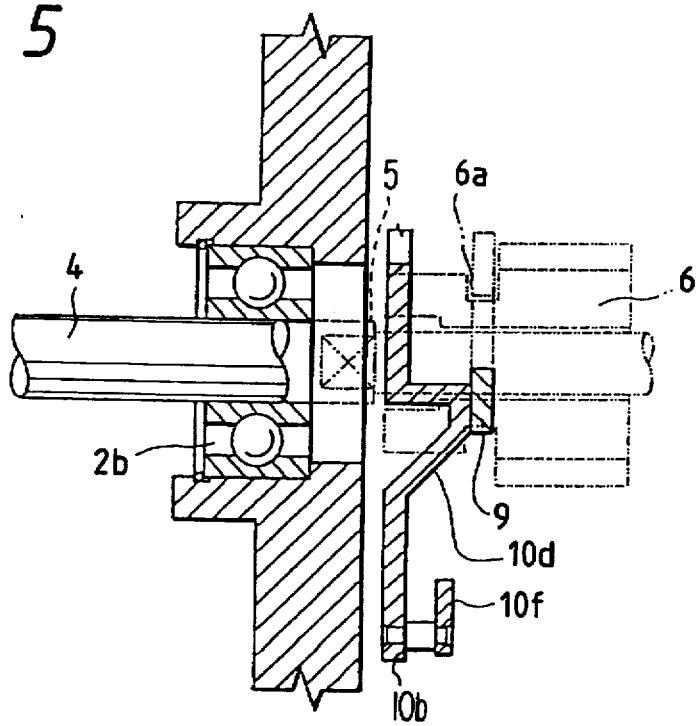
FIG. 5 is a sectional illustration along line 3—3 in FIG. 2 for explanation of a clutch OFF condition of the reel for fishing according to the first embodiment of the invention.

Depressing the operating portion 10a of the switching member 10 releases the clutch plate 9 from being constrained by the limiting portion 10f and permits the clutch plate 9 to move in the separating direction along the guiding slope 10d, as shown in FIG. 4. Consequently, the clutch plate 9 reaches the top portions of the cam portions 10c, as shown in FIG. 5. Under this condition, the engagement between the pinion gear 6 and the spool shaft 4 is disengaged to and the reel assumes the clutch OFF condition so that the spool 3 becomes free.

Next, a second embodiment of the invention will be described.

In the second embodiment, limiting portions are provided on the clutch plate to prevent the clutch plate from moving away from the switching member under the clutch ON condition. This contrasts with the first embodiment described above, where the branch portions 10b of the switching member 10 define the limiting portions 10f.

Figure 6:
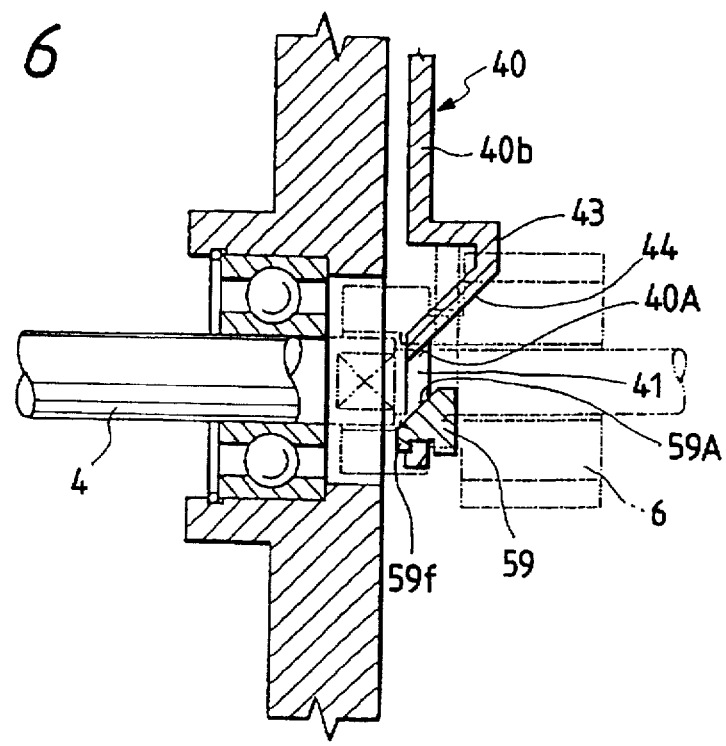
FIG. 6 is an illustration for explanation of the main parts of the reel for fishing according to a second embodiment of the invention and shows a clutch ON condition.

Namely, in the second embodiment, a switching member 40 includes elongated slots 41 on branch portions 40b, as shown in FIG. 6, and on the other hand, a clutch plate 59 includes curved limiting portions 59f which can engage the edges of the slots 41. When the clutch is ON, as shown in FIG. 6, the limiting portions 59f engage the edges of the slots 41 to prevent the clutch plate 59 from moving away.

The remaining features of the clutch mechanism according to the second embodiment are the same as those in the first embodiment. In FIG. 6, 43 denotes the protruding cam portions for positioning the clutch plate 59, and 44 denotes the guiding slope portions for guiding to the cam portions 43.

Figure 7:
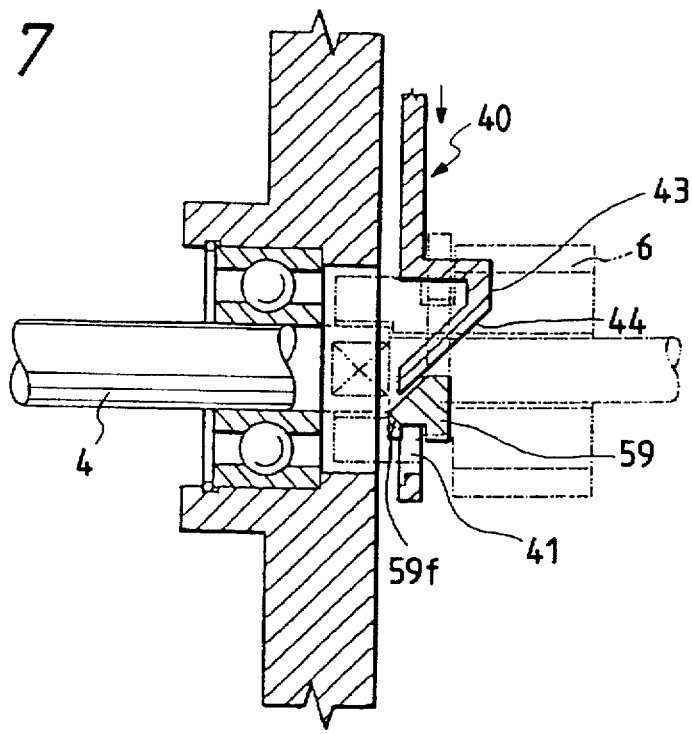
FIG. 7 is an illustration for explanation of the operation of the reel for fishing according to the second embodiment of the invention.

Sliding the switching member 40 from the condition shown in FIG. 6 results in, as shown in FIG. 7, disengagement of the limiting portions 59f which were engaged with the slots 41. When, from this condition, the switching member 40 is further pressed in the direction shown by the arrow, the clutch plate 59 moves axially away along the guiding slope portions 44 to the cam portions 43, thereby disengaging the pinion gear 6 and the spool shaft 4 so that the clutch is OFF.

In order to facilitate the movement, slope portions 40A and 59A are provided on the inner surface of the slots 41 of the switching member 40 and the engagement portions of the clutch plate 59 respectively.

Figure 8:
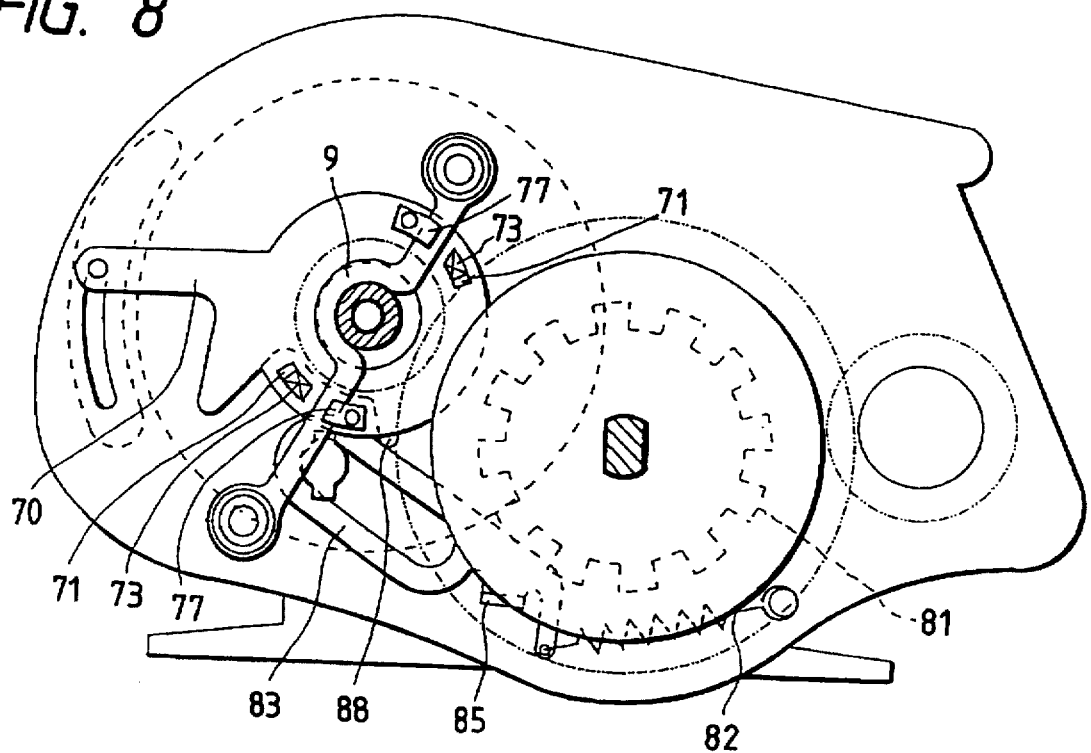
FIG. 8 is a side perspective view of the reel for fishing according to a third embodiment of the invention and shows a clutch ON condition.

In the invention, the clutch member may be a rotatable plate even though in the first and second embodiments, the clutch member is slidable plate. That is, as shown in FIG. 8, a switching member 70 includes protruding cam portions 71 and guiding slope portions 73, on the surface facing the clutch plate 9 at the rotational clutch OFF position, for moving the clutch plate forcibly in the separating direction. Integrally provided on the switching member 70 are limiting portions 77 which engage the clutch plate 9 to prevent the clutch plate 9 from moving in the separating direction when the switching member 70 is at the rotational clutch ON position.

Figure 9:
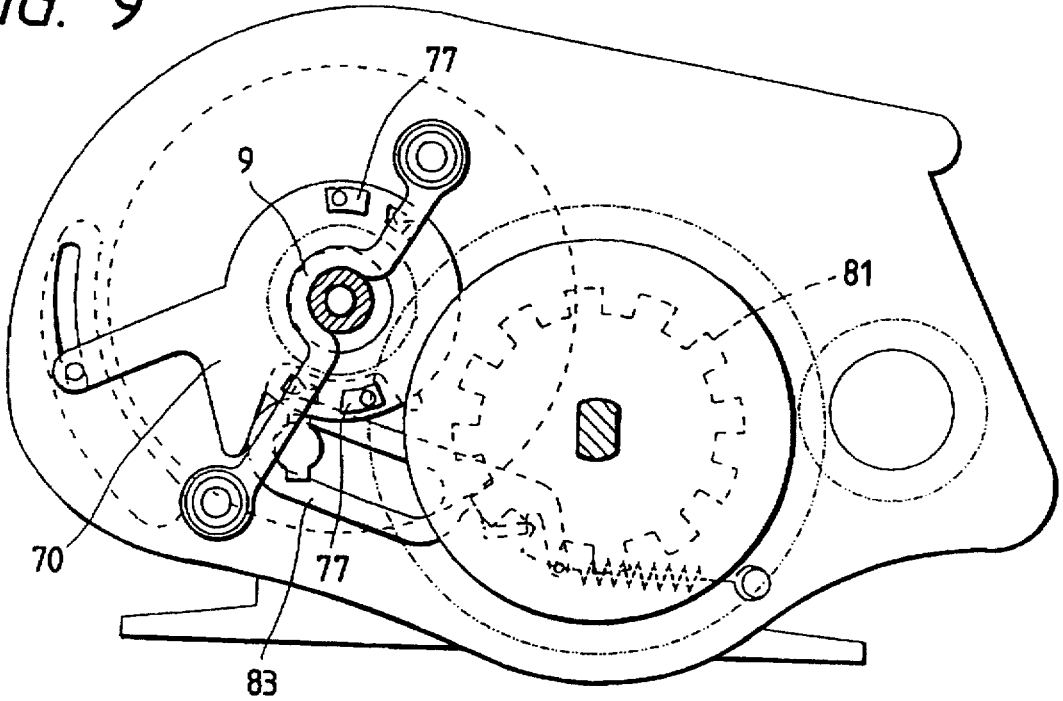
FIG. 9 is a side perspective view of the reel for fishing under a clutch OFF condition according to the third embodiment.

FIG. 8 illustrates the clutch ON condition, in which the clutch plate 9 is sandwiched between the disc surface and the limiting portions 77 of the switching member 70 to prevent the clutch plate 9 from moving in the separating direction. From this condition, rotation of the switching member in the counter-clockwise direction results in the guiding slope portions 73 approaching and contacting the back of the clutch plate 9 to move the clutch plate 9 in the separating direction so that the clutch engagement between the pinion gear and the spool shaft is disengaged, as shown in FIG. 9. The cam portions 71 pressing against the back of the clutch plate 9 maintain the clutch OFF condition.

The mechanism for returning the clutch from OFF to ON, according to the third embodiment, is similar to that known in the prior art, and comprises a returning gear 81 which rotates with the rotation of the handle, a kick plate 83 biased by a spring 82, an engagement projection 85 which is integrally provided with the kick plate 83 to engage the return gear 81 when the clutch is OFF, and a stopper 88 for preventing the rotation of the kick plate 83 when the clutch is ON. The clutch returning mechanism is not an essential feature of the present invention, and thus may be constructed using other arrangements.

According to the invention, a stable, problem free winding operation is provided, even if a large load is applied. Therefore, comfortable fishing is obtained since the engagement between the pinion and the spool shaft is held by the limiting means during the winding condition.

Further, according to the invention, the twisting angle arrangement of the driving and pinion gears can be reduced since the engagement of the clutch is held by the limiting means. Also, since the biasing force onto the clutch plate to the spool side can be reduced, the pinion can move in the direction opposite to the spool smoothly to provide comfortable switching of the spool from the winding condition to the free condition.

What is claimed is:

1. A reel for fishing having a spool provided between side plates of a reel main body and a clutch mechanism for switching the spool between a fishline winding condition, wherein rotation of a handle is transmitted to the spool through a pinion gear, and a spool free condition, wherein the spool is free from the handle, the clutch mechanism comprising:

a clutch plate engaged with the pinion gear for moving the pinion gear in an axial direction to disengage the pinion gear from an engagement portion that is connected to the spool and rotates together with the spool when the spool is switched to the spool free condition; and a switching member abutting against the clutch plate and comprising a first portion at least partly interposed axially between the engagement portion and the clutch plate and a second portion integral with the first portion and positioned axially away from the spool such that the clutch plate is at least partly interposed axially between the first portion and the second portion when the spool is in the fishline winding condition, wherein the switching member prohibits substantial axial movement of the clutch plate away from the spool and maintains the engagement between the pinion gear and the engagement portion when the spool is in the fishline winding condition.

2. A reel for fishing according to claim 1, wherein the second portion is a limiting portion abutting against a surface of the clutch plate opposite from the spool in the axial direction when the spool is in the fishline winding condition.

3. A reel for fishing according to claim 1, wherein the first portion is a switch member and the second portion is a limiting portion spaced from the switch member, and the clutch plate is at least partly sandwiched between the switch member and the limiting portion in the axial direction when the spool is in the fishline winding condition.

4. A reel for fishing according to claim 1, wherein the second portion is a limiting portion movable along a plane orthogonal to the axial direction, to engage the clutch plate when the spool is switched to the fishline winding condition.

5. A reel for fishing according to claim 4, wherein the limiting portion is moved linearly along a lengthwise axis of the switching member.

6. A reel for fishing according to claim 4, wherein the limiting portion is moved orbitally around an axis of rotation of the switching member.

7. A reel for fishing having a spool provided between side plates of a reel main body and a clutch mechanism for switching the spool between a fishline winding condition, wherein rotation of a handle is transmitted to the spool through a pinion gear, and a spool free condition, wherein the spool is free from the handle, the clutch mechanism comprising:

a clutch plate engaged with the pinion gear for moving the pinion gear in an axial direction to disengage the pinion gear from an engagement portion that is connected to the spool and rotates together with the spool when the spool is switched to the spool free condition; and a switching member abutting against the clutch plate;
wherein the clutch plate comprises a first portion at least partly interposed axially between the engagement portion and the switching member and a second portion integral with the first portion and positioned axially away from the spool such that the switching member is at least partly interposed axially between the first portion and the second portion when the spool is in the fishline winding condition; and wherein the switching member prohibits substantial axial movement of the clutch plate away from the spool and maintains the engagement between the pinion gear and the engagement portion when the spool is in the fishline winding condition.

8. A reel for fishing according to claim 7, wherein the first portion is a limiting portion abutting against a surface of the switching member proximate to the spool in the axial direction when the spool is in the fishline winding condition.

9. A reel for fishing according to claim 7, wherein the second portion is a clutch plate main body and the first portion is a limiting portion spaced from the clutch plate main body, and the switching member is at least partly sandwiched between the clutch plate main body and the limiting portion in the axial direction when the spool is in the fishline winding condition.

10. A reel for fishing according to claim 7, wherein the first portion is a limiting portion movable along a plane orthogonal to the axial direction, to engage the switching member when the spool is switched to the fishline winding condition.

* * * * *